United States Patent [19]

Rasmussen et al.

[11] Patent Number: 4,667,012
[45] Date of Patent: May 19, 1987

[54] IMIDAZOLINONE-CONTAINING POLYMER AND COPOLYMER

[75] Inventors: Jerald K. Rasmussen, Stillwater, Minn.; Alan R. Katritzky, Gainesville, Fla.; Larry R. Krepski, White Bear Lake, Minn.; Howell K. Smith, II, Lauderdale, Minn.; Steven M. Heilmann, North St. Paul, Minn.; Kumars Sakizadeh, Gainesville, Fla.

[73] Assignee: Minnesota Mining and Manufacturing Company, St. Paul, Minn.

[21] Appl. No.: 681,553

[22] Filed: Dec. 14, 1984

[51] Int. Cl.$^4$ ............................................. C08G 73/06
[52] U.S. Cl. ................................. 528/332; 526/258; 526/263; 528/327; 528/341; 528/373; 528/403; 528/405; 528/422; 528/423
[58] Field of Search ............... 528/332, 405, 403, 327, 528/341, 373, 422, 423; 526/263, 258

[56] References Cited

U.S. PATENT DOCUMENTS 3,678,005  7/1972  Rabilloud et al. ................. 528/327

OTHER PUBLICATIONS

Ueda, et al. J. Polym. Sci., Polym. Chem. Ed., 1975, 13, 659–677.

*Primary Examiner*—Harold D. Anderson
*Attorney, Agent, or Firm*—Donald M. Sell; James A. Smith; Lorraine R. Sherman

[57] ABSTRACT

A novel class of heterocyclic polymers and copolymers containing the 2-imidazolin-5-one ring structure is described. These polymers are prepared by reaction of bisazlactones and diamines, with or without suitable condensation monomers; the resultant polyamides are then thermally cyclodehydrated in the presence of a catalyst to produce the imidazolinone-containing polymers. Many of the poly(imidazolinones) are water soluble and therefore find utility in various aspects of water treatment, or in paper or fabric sizing.

19 Claims, No Drawings

IMIDAZOLINONE-CONTAINING POLYMER AND COPOLYMER

DESCRIPTION

1. Field of the Invention

This invention relates to polymers comprising 2-imidazolin-5-one units. In another aspect, it relates to a process for preparing heterocycle-containing polymers. The novel polymers are useful in water treatment and paper and fabric sizing applications.

2. Background Art

Low molecular weight 2-imidazolin-5-ones, which are also referred to in the art as imidazolinones (indexed in Chemical Abstracts as "3,5-dihydro-4H-imidazol-4-ones"), are known and have been prepared by a variety of methods (see, for example, R. Jacquier, J. M. Lacombe, G. Maury, *Bull. Soc. Chim. Fr.* 1971, 1040–1051). One such procedure has been disclosed by A. Kjaer (*Acta Chem. Scand.*, 1953, 7, 889–899). This reference teaches reaction of an azlactone with an amine to give an amide, then cyclization to a 2-imidazolin-5-one was accomplished by treatment with aqueous alkali (Equation 1).

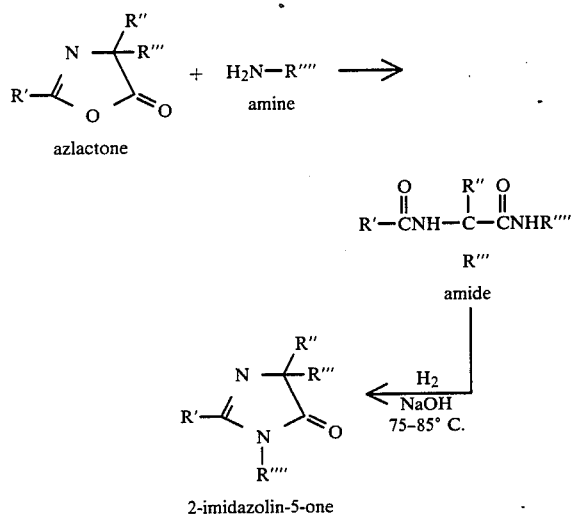

Equation 1

French Pat. No. 887,530 (1943) describes the preparation of high molecular weight polyamides and polyesteramides by the reaction of bisazlactones with diamines, diols, or aminoalcohols. This reference teaches that with amino-compounds reaction temperatures must be kept as low as possible, preferably between 80° and 150° C. In addition, it is stated that with primary amines, extra precautions must be taken to prevent side reactions from occurring. It is recommended that a solvent be used to help keep the reaction temperature low.

Polyamides from bisazlactones and diamines have also been described by C. S. Cleaver and B. C. Pratt (*J. Am. Chem. Soc.*, 1955, 77, 1541–1543). These polymers were prepared by reacton in solvents, and were described as being amorphous, high melting, difficultly soluble materials which decomposed at their melting points.

Ueda, et al. (*J. Polym. Sci., Polym. Chem. Ed.*, 1975, 13, 659–677) disclosed the uncatalyzed preparation of six different polyamides from arylidene bisazlactones. Based on DTA (Differential Thermal Analysis) and TGA (Thermal Gravimetric Analysis) analyses of one of these polymers it was postulated that cyclodehydration to the poly(arylidenimidazolinone) might occur upon heating. The resultant polymer was stated to be soluble only in concentrated $H_2SO_4$. Applicants have shown by DTA that some of the polyamides obtained by reaction of bisazlactones and diamines undergo a thermally induced weight loss at 150°–200°0 C. This could be interpreted, as it was by Ueda, as an indication of imidazolinone formation. However, Applicants have been unable to verify that this weight loss results in imidazolinone formation in the absence of a catalyst. (See Table I, Example 3, and Comparative Example 5 below). Therefore, to Applicants knowledge no polymers have been prepared previously incorporating the 2-imidazolin-5-one ring system.

SUMMARY OF THE INVENTION

Briefly, the present invention provides a class of block and random polymers comprising one or more 2-imidazolin-5-one units contained within the main polymer backbone.

The novel heterocycle-containing homopolymers and copolymers of the invention can be prepared by a ring-opening reaction of an azlactone-functional compound with a nucleophilic group-substituted primary amine, optionally in the presence of additional condensation-type monomers, to provide a polyamide. The resultant polyamide in the presence of a cyclodehydration catalyst can be subsequently converted to the heterocycle-containing polymers of the invention.

In this application:

a 2-imidazolin-5-one (imidazolinone) nucleus means:

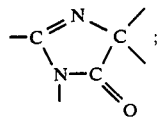

an 2-oxazolin-5-one (azalactone) nucleus means:

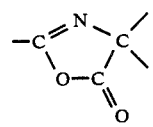

"monomer" means a compound having no recognizable repeating unit, that is, could not be readily prepared by the linking together of suitable monomers followed, if necessary, by chemical modification of the end groups;

"oligomer" means a compound having 2 to 5 repeating units;

"polymer" means a compound having more than 5 repeating units;

"aryl" means the univalent residue of an aromatic compound (single ring and multi- and fused-cyclic) and includes alkyl ($C_1$ to $C_4$)-substituted aromatics such as alkaryl and aralkyl residues, as well as heterocylic aromatic compounds having up to 4 heteroatoms per ring selected from N, S, and O such as pyridine, thiophene, furan, pyrimidine, pyrrole, and oxadiazole;

"nucleophilic group" means an —XH group, wherein X is —NR (where R is as defined below), —S—, or —O— which can be attached to an organic group $R^d$; $R^d$—XH is capable of undergoing a nucleophilic ring-opening reaction with an azlactone as follows:

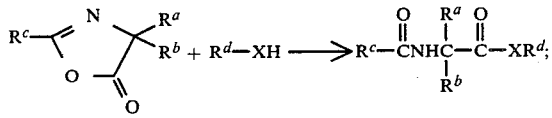

"non-nucleophilic group" means a group incapable of a nucleophilic ring-opening reaction with an azlactone, i.e., groups other than amines, alcohols, and thiols;
"polyester" means the reaction product of an alcohol and a carboxylic acid; and
"backbone" means the main chain of a polymer.

DETAILED DESCRIPTION OF THE INVENTION

The present invention provides a class of polymers comprising one or more of 2-imidazolin-5-one units, preferably comprising 0.5 to 100 mole percent of 2-imidazolin-5-one units and 99.5 to 0 mole percent of other units derived from condensation-type monomers, the 2-imidazolin-5-one units having the structural formula I

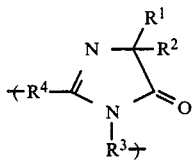

wherein
$R^1$ and $R^2$ independently represent an alkyl group having 1 to 12 carbon atoms, cycloalkyl group having 3 to 12 carbon atoms, an aryl group having 6 to 12 carbon atoms, or $R^1$ and $R^2$ taken together with the carbon atom to which they are attached form a 5- to 12-membered carbocyclic ring;
$R^3$ is a divalent organic group which is part of a nucleophilic group substituted monomeric, oligomeric, or polymeric primary amine of formula II $$H_2N—R^3—XH \qquad II$$

wherein
X is

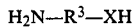

—O—, or —S—, and
R is hydrogen or an alkyl group of 1 to 12 carbon atoms or an aryl group of 6 to 12 carbon atoms,
$R^3$ having a molecular weight of up to 20,000 and is preferably selected from a hydrocarbyl group (i.e., alkylene group having 2 to 20 carbon atoms or an arylene groups having 2 to 20 carbon atoms and optionally can be interrupted by one to five catenary heteroatoms of oxygen, nitrogen, silicon, or sulfur), and polyoxyalkylene, polyamide, polyester, polyolefin, polyacrylate, and polysiloxane groups that can optionally all be further substituted by at least one non-nucleophilic group such as cyano, halo, ester, ether, keto, nitro, silyl, or sulfide (the carbon-containing groups having up to 10 carbon atoms); and
$R^4$ is a divalent organic group selected from the group consisting of

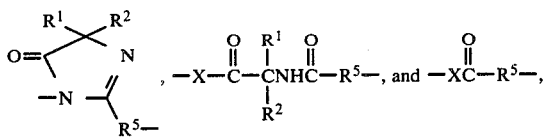

wherein $R^1$, $R^2$, and X are as defined above and $R^5$ is a divalent organic group having a molecular weight up to 20,000, preferably selected from a hydrocarbyl group (i.e., an alkylene group having 2 to 20 carbon atoms and an arylene group having 6 to 20 carbon atoms and optionally can be interrupted by one to five catenary heteroatoms of oxygen, nitrogen, silicon or sulfur), polyoxyalkylene, polyester, polyolefin, polyacrylate, and polysiloxane groups that can optionally all be further substituted by at least one non-nucleophilic group such as cyano, halo, ester, ether, keto, nitro, silyl, or sulfide (the carbon-containing groups having up to 10 carbon atoms).

The novel polymers of this invention can be prepared by reaction of azlactone-functional compounds of formula III

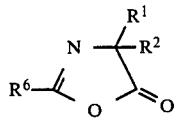

wherein
$R^1$ and $R^2$ are as defined above, and $R^6$ is selected from

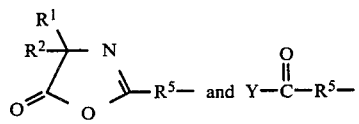

wherein
Y is HO—, $R^7O$—, or $CH_3COO$—,
$R^7$ is lower alkyl of 1 to 4 carbon atoms, phenyl or phenyl substituted by non-nucleophilic groups, and
$R^5$ is as defined above; with nucleophilic group-substituted amines of formula II above.

The initial result of this reaction is the formation of a polyamide having a repeating unit of formula IV

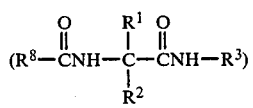

wherein

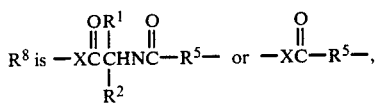

and X, $R^1$, $R^2$, and $R^5$ are as defined above.

Thermal treatment of polyamides of formula IV in the presence of a dehydration catalyst produces the instant polymers containing one or more 2-imidazolin-5-one units of formula I and having a molecular weight in the range of 500 to 80,000.

Copolymers containing less than 100% of units of formula I may be prepared by incorporation of other condensation-type monomers (for example, dicarboxylic acids, diols, hydroxyacids or lactones, di-secondary diamines, secondary aminoalcohols, secondary aminoacids or the corresponding lactams, tetracarboxylic acid dianhydrides, tricarboxylic acid anhydrides and/or diisocyanates) along with compounds of formulas II and III or combination or mixtures thereof. Condensation of the comonomer and the above described azlactone and amine results in polymer units (e.g., ester, amide, urethane, or urea units) which cannot cyclize to imidazolinone units.

The azlactone-functional compounds of formula III useful for the purposes of the present invention are of two types. Preferred formula III compounds are bisazlactones of formula V

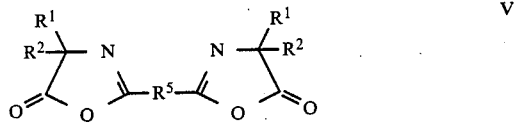

wherein $R^1$, $R^2$, and $R^5$ are as defined above. Bisazlactones of formula V are well known in the art. Bisazlactones in which $R^5$ is alkylene of arylene, as defined above, for example, are readily prepared by reaction of a corresponding diacid chloride with an appropriate amino acid followed by cyclodehydration (Equation 2 below) using, for example, acetic anhydride (C. S. Cleaver, B. C. Pratt, *J. Amer. Chem. Soc.*, 1955, 77, 1544–1546), or ethyl chloroformate/triethylamine (L. D. Taylor, T. E. Platt, M. H. Mach, *J. Polym. Sci., Polym Letters*, 1970, 8, 537–540) as the dehydrating agent.

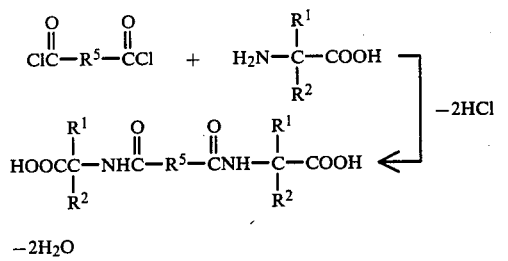

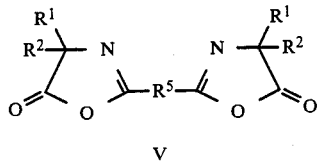

V

Equation 2

Another class of bisazlactones useful in the present invention are those that can be prepared by a Michael-type addition of an amino or thiol group-substituted nucleophilic compound to an alkenyl azlactone and are disclosed in assignee's copending patent application U.S. Ser. No. 424,500, filed Sept. 27, 1982, now allowed, and incorporated herein by reference.

Second types of azlactone-functional compounds are those of formula VI,

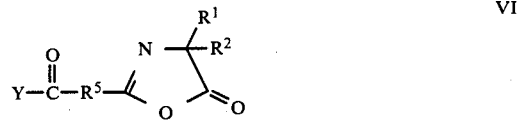

wherein $R^1$, $R^2$, $R^5$, and Y are as defined above, and can be prepared by procedures analogous to those used for the preparation of bisazlactones of formula V. For example, the monoadduct of a diacid and an aminoacid can be converted to an azlactone-functional compound possessing a carboxylic acid group (see Equation 3 below). The preparation of other compounds VI should be obvious to one skilled in the art.

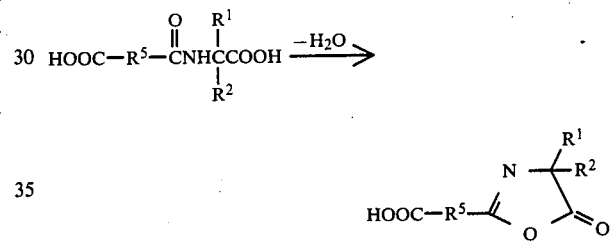

Equation 3

The nucleophilic group-substituted monomeric, oligomeric, or polymeric amines of general formula II which are useful in the preparation of the novel polymers of the invention can vary widely within the scope of this invention.

Representative examples of monomeric amines of formula II include di-primary diamines, such as ethylene diamine, 1,2-propanediamine, 1,4-diaminobutane 1,6-hexanediamine, 1,12-dodecanediamine, 1,4-diaminocyclohexane, 4,4'-methylenebis(cyclohexylamine), m-xylylenediamine, 1,3-bis(3-aminopropyl)-1,1,3,3-tetramethyldisiloxane, and 1,3-cyclohexanebismethylamine; primary-secondary amines such as N-methylethylenediamine, N-ethyl-1,6-hexanediamine, N-phenyl-1,12-dodecanediamine, and N-benzylethylenediamine; aminoalcohols such as ethanolamine, 4-hydroxybutylamine, 6-hydroxyhexylamine, 12-hydroxydodecylamine, 2-hydroxycyclohexylamine, N-(2 hydroxyethyl)-ethylenediamine and 1,2- or 1,3-propanolamines; and aminothiols such as 2-aminoethanethiol. Examples of oligomeric amines of formula II include alkylene imines such as diethylenetriamine, triethylenetetramine, tetraethylenepentamine, 3,3-iminobispropylamine, 1,5-Bis(3-aminopropyl)-1,1,3,3,5,5-hexamethyltrisiloxane, N-methyliminobispropylamine, oxybispropylamine, oxybisethylamine, dimer diamine, 4,9-dioxa-1,12-dodecanediamine, 2-hydroxyethoxyethylamine, N-aminoethylpiperazine, N,N'-bis(3-aminopropyl)-piperazine, Jeffamine D-230 ™ (a diprimary diamine of approximate structure

available from Texaco Chemical, Inc. Bellaire, TX), N,N',-bis(3-aminopropyl)ethylenediamine, N,N'-1-bis(3-aminopropyl)-1,4-butanediamine, and 6,6'-diaminodihexylamine. Polymeric amines of formula II include a wide variety of amine-functional polymers such as polyoxyalkylenediamines, amine-terminated polyamides, polysiloxane diamines, amino-functional polybutadienes and polybutadiene copolymers, and polyethylenimine. Examples of the polyoxyalkylene diamines include the polyethylene- and polypropylene oxide based diamines available from Texaco Chemical under the trade name Jeffamine ™ (ED- and D- series respectively) and the DU-Series Jeffamines prepared by thermal condensation of D-series Jeffamines and urea according to U.S. Pat. No. 4,178,427, which is incorporated herein by reference. Other useful polyoxyalkylene diamines can be readily prepared from various polyethylene- polypropylene-, or polytetramethylene glycols via standard cyanoethylation-reduction procedures well known in the art. Amine-terminated polyamides of use in the invention may be readily prepared, as is obvious to one skilled in the art, by the polymerization reaction of an excess amount of diamine with a dicarboxylic acid (or diacid derivative, e.g., diester) or of a diamine with an amido acid (or its corresponding lactam). In these polymerizations it is apparent to one skilled in the art that the molecular weight of the amine-terminated polyamide can be controlled by adjustment of the relative amounts of diamine and diacid or aminoacid utilized. A particular class of amine-terminated polyamides which can be utilized in the invention are those prepared by reaction of a diacid and a polyether diamine according to U.S. Pat. Nos. 4,107,061 and 3,257,342, which are incorporated herein by reference. Polysiloxane diamines of use in the invention have the formula VII

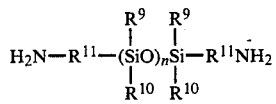

wherein
$R^9$ and $R^{10}$ can be the same or different and independently represent an alkyl group of 1 to 12 carbon atoms, a cycloalkyl group of 3 to 12 carbon atoms, or an aryl group of 6 to 12 carbon atoms;
$R^{11}$ is an alkylene chain of 1 to 12 carbon atoms; and n is an integer from 5 to 2,000.

These materials are readily prepared by the base-catalyzed equilibration of cyclic siloxanes (e.g. dimethylsiloxane tetramer) using standard reaction conditions (see, e.g. I. Yilgor, et. al., *Polymer Preprints*, 1983, 24(1), 167–169). Representative of amino-functional polybutadienes and polybutadiene copolymers are amine-terminated polybutadienes and butadiene/acrylonitrile copolymers.

Reaction of azlactone-functional compounds of formula III with amines of formula II to provide intermediate polyamides of formula IV is known in the art (see Cleaver and Pratt, *J. Am. Chem. Soc.*, 1955, 77, 1541–1543, U.S. Ser. No. 424,500, supra). This reaction can take place in a suitable organic solvent, i.e., one that does not contain a nucleophilic group and will not react with an azlactone (for example, acetone, ethyl acetate, benzene, toluene, and the like) or in the absence of a solvent. This later method (solventless) is preferred since it allows the subsequent preparation of the novel polymers of the invention in conventional equipment and under conditions well known in the art for the preparation of typical polyesters and polyamides.

Intermediate polyamides of formula IV may also be prepared preferably under standard melt condensation conditions (e.g., 30°–350° C., preferably 100°–300° C. under reduced pressure, e.g., less than 100 torr) from the acyclic precursors of azlactones of formula III and the amines of formula II, as shown in Equation 4 below

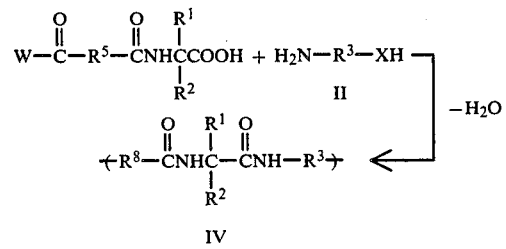

Equation 4 wherein
W is Y— or

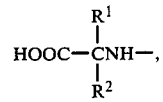

and
$R^1$, $R^2$, $R^3$, $R^5$, $R^8$, and Y are as defined above.

While it is known in the art that condensation polymerization of β-aminoacid derivatives is possible (see for example, U.S. Pat. Nos. 4,393,912, and 4,429,109, on preparations of polyesters and polyamides respectively from N,N'-terephthaloyl-β-alanine), applicants are not aware of any examples of the polymerization of α-aminoacid derivatives as depicted in Equation 4.

The conversion of intermediate polyamides of formula IV to the heterocycle-containing polymers of the present invention can be accomplished in general by heating the polyamides in the presence of a catalyst for the imidazolinone ring-forming dehydration reaction. Temperatures useful for this conversion are in the range of 30° to 350° C., preferably 100° to 300° C., and most preferably in the range 150° C. to 250° C. Reaction times needed for the cyclization vary depending upon the nature of the intermediate polyamide and the catalyst, but generally range from about 0.5 hour to 48 hours, preferably 0.5 to 18 hours.

In general it is desirable to conduct both the preparation of the intermediate polyamide and the cyclization reaction under an inert atmosphere, such as nitrogen or argon. In addition it is preferred to conduct the later stages of the cyclization reaction under reduced pressure, e.g. less than 100 torr, to ensure removal of the last traces of water which are formed.

Both acids and bases can catalyze the cyclization. When basic catalysts are used, they may be classified as either internal or external catalysts. By "internal" is meant that the catalyst is present as part of the polymer structure (for example, as secondary or tertiary amine functionality in the polymer backbone). Polyamides containing such internal catalysts have been found to undergo conversion to the polymers of the invention with surprising facility, for example, heating at 180° C. for 2 hours. With those polyamides which do not contain an "internal" catalyst, an "external" catalyst must be added to accomplish the dehydration. Examples of basic catalysts which may be added are (1) metal salts of carboxylic acids, such as sodium acetate, potassium pivalate, sodium 2-ethylhexanoate, sodium benzoate, cesium acetate, potassium cyclohexanebutyrate, and sodium carbonate (2) amines, preferably tertiary amines such as triethylamine, tributylamine, 4-dimethylaminopyridine, diazabicyclooctane (DABCO), diazabicycloundecene (DBU) and tetramethylethylenediamine, since secondary and especially primary amines would have the tendency to undergo transamidation reactions with the polyamide at higher temperatures;

(3) alkoxides such as sodium methoxide, sodium ethoxide, potassium tertiary butoxide, sodium phenoxide, and sodium and potassium hydroxide.

Examples of acidic catalysts which may be added are Lewis acids such as dibutyltin dilaurate, dibutyltin diacetate, zinc chloride, zinc bromide, zinc iodide, zinc acetate, zinc cyanide, aluminum chloride, aluminum bromide, ferric chloride, boron trifluoride, and tetrabutyl titanate.

As should be obvious to one skilled in the art, the rate of cyclization of a particular polyamide will be controlled by a number of variables including the structure of the polyamide, the nature of the catalyst and its efficiency, and the temperature and length of time at which the reaction is conducted. While in most instances it may be desirable to obtain complete cyclization to imidazolinone units, it is contemplated as being within the scope of the invention to convert only a portion of the amide linkages to imidazolinone units. This may be accomplished by control of the variables cited above, in particular the reaction time. The extent of cyclization is readily determined by examination of the $^1$H-NMR spectrum of the poly(imidazolinone) and comparing its spectrum with the spectrum of the polyamide precursor. In addition, $^{13}$C-NMR can be used to verify the formation of the imidazolinone ring.

It is contemplated as being within the scope of the present invention to prepare polymers in which less than 100% of the repeating units have the structure I. As should be obvious to one skilled in the art, this may be accomplished by the addition of other condensation-type monomers to the reaction mixture of azlactone of formula III and amine of formula II. These additional monomers may be added either at the beginning of the polymerization reaction, or subsequent to the preparation of a polyamide of formula IV. Proper adjustment of reactant stoichiometry will ensure copolymer formation as is well known in the art. Examples of condensation-type monomers which may be added include dicarboxylic acids (or their derivatives) such as adipic acid, sebacic acid, azelaic acid, terephthalic acid, isophthalic acid, dimer acid dimethyl adipate, dimethyl terephthalate, succinic anhydride, maleic anhydride, trimellitic anhydride, and benzophenone tetracarboxylic dianhydride; diols such as ethylene glycol and butyleneglycol; polyether diols such as polyethyleneglycol and polypropyleneglycol; polyester diols such as polycaprolactone diol, polyneopentyl adipatediol, and other hydroxyterminated polyesters; amino acids and hydroxyacids or their derivatives such as caprolactone, caprolactam, 11-aminoundecanoic acid, glycolic acid, 12-aminododecanoic acid, lauryllactam, and 4-hydroxybutyric acid; and diisocyanates such as toluene diisocyanate, methylenediphenyl diisocyanate, and 1,6-hexanediisocyanate.

By incorporation of these additional comonomers it is possible to prepare, for example, poly(amide-imidazolinone), poly(ester-imidazolinone), poly(urethane-imidazolinone), poly(urea-imidazolinone), and poly(imide-imidazolinone) copolymers.

In general, the imidazolinone-containing polymers of the present invention have been found to be lower melting, more soluble in a variety of solvents, and more thermally stable than their polyamide precursors. Quite surprisingly, many of the polyimidazolinones have been found to be water-soluble or water dispersible. This property coupled with the multiplicity of polar functional groups provide polymers which have utility in such applications as the chelation of metal ions, flocculation and water clarification, paper and fabric sizing, etc. Solutions of the polymers display fluorescence under long wavelength UV light, thus suggesting potential use as optical brighteners, for example in fabric treatments or laundry detergent formulations.

Objects and advantages of this invention are further illustrated by the following examples, but the particular materials and amounts thereof recited in these examples, as well as other conditions and details, should not be construed to unduly limit this invention. In all cases reactions were conducted under an inert atmosphere of argon or nitrogen.

EXAMPLE 1

A. Preparation of an intemediate polyamide in solution and its subsequent isolation Triethylenetetramine (2.9 g, 0.02 Mol) was dissolved in dimethylformamide (DMF) (20 mL). To this mixture was added, with stirring, 2,2'-tetramethylenebis(4,4-dimethyloxazolin-5-one) (5.6 g, 0.02 Mol). The temperature of the mixture rapidly rose to about 50° C., then slowly cooled back to room temperature (about 25° C.) over 45 minutes. Stirring was continued at room temperature for 22 hours, then 10 mL of the mixture was withdrawn and precipitated into 200 mL acetone. The precipitate was filtered, washed with ether, and dried under vacuum at 50°-60° C. overnight to yield 2.80 g of colorless product, inherent viscosity (0.5 g/100 mL DMF)=0.12 dL/g. Spectral analyses verified the polyamide structure.

B. Complete cyclization by heating the isolated polyamide in the absence of solvent A sample of the polymer prepared and isolated as in A. above was placed in a round bottomed flask equipped with a vacuum take off. The flask was evacuated to a pressure of about 1 torr. and placed in an oil bath. The temperature of the bath was raised to 180° C. over 45 minutes, then held at 180°-190° C. for two hours and 15 minutes. Bubbling of the molten polymer mass was observed; this was fairly rapid at first but had nearly ceased at the end of the heating period. The bath was removed, the polymer was allowed to cool, then was broken up and collected as a light yellow, glassy material. Spectral analyses indicated essentially complete cyclization of the amide function to the imidazolinone structure.

C. Partial cyclization by heating the polyamide in solution and subsequent isolation The remainder of the polyamide solution in DMF from A. above was heated to 140° C. and held at that temperature for 4 hours, then precipitated into acetone (250 mL) to give a gummy oil. The supernatant was decanted, and the oil triturated with ether, filtered, and dried as in A. to give 1.06 g colorless polymer, inherent viscosity 0.18 dL/g (DMF). Spectral analyses indicated about 50% cyclization of the amide linkages to the imidazolinone structure.

This example shows addition of a cyclization catalyst is not necessary when there are amino groups, i.e., "internal", present in the polyamide.

Comparative Example 1 p-Phenylenebis(4,4-dimethyl-2-oxazolin-5-one) (3.0 g, 0.01 Mol) and Jeffamine D-400 ™ (polyoxypropylene diamine, amine equivalent weight 217.3, 4.35 g, 0.01 Mol) were mixed in a round-bottomed flask to give a paste. No apparent reaction occurred at room temperature. The contents of the flask were placed under a flow of argon and the flask immersed, with stirring, in a Wood's metal bath at 200° C. The reaction mixture rapidly solidified. The bath temperature was raised to 250° C. over 25 minutes, by which time the polymer mass had remelted. Heating was continued for 2 hours at 250° C., the additional 1.5 hours at 250° C. under reduced pressure (1 torr). The heating bath was then removed, and the molten polymer poured onto a teflon ™ sheet. Upon cooling, a hard, brittle solid was formed. Spectral analysis indicated that the product was the polyamide and that no cyclization had occurred. This example shows the lack of cyclization in the absence of a catalyst.

EXAMPLE 2 p-Phenylenebis(4,4-dimethyl-2-oxazolin-5-one) (3.00 g, 0.01 Mol) and Jeffamine D-2000 (19.44 g, 0.01 Mol) were mixed at room temperature under argon, then placed in an oil bath at 220° C. The stirred mixture was heated for 1 hour at 220° C., the last 30 minutes under vacuum (less than 1 torr). Spectral analysis of a sample (A) indicated that the expected polyamide had been formed. Sodium acetate (0.082 g, 0.001 Mol) was added and the mixture heated 1 hour at 220° C., less than 1 torr. IR analysis of a sample indicated a small amount of cyclization had occurred. Another portion of sodium acetate (0.164 g, 0.002 Mol) was added and heating continued under the same conditions for an additional 3 hours. Spectral analysis of the final product (Sample B) indicated about 40% cyclization to imidazolinone units. Molecular weight data obtained by GPC on the polymers were as follows:

|  | $M_n$ | $M_w$ | P |
|---|---|---|---|
| Sample A: | 3510 | 18,100 | 5.15 |
| Sample B: | 4610 | 24,300 | 5.28 |

This example illustrates the use of an external catalyst.

Comparative Examples 2 and 3

A polyamide was prepared from p-phenylenbis(4-methyl-2-oxazolin-5-one) and Jeffamine D-2000 by a procedure similar to that of Example 2 except that a bath temperature of 250° C. was required. Addition of sodium acetate (30 mole %) and further heating (240° C., 1 hour, less than 1 torr) caused the polymer to darken and become opaque in the melt. Spectral analysis revealed no evidence for cyclization.

Similarly, a polyamide was prepared, as in Example 2, from p-phenylenebis(2-oxazolin-5-one) and Jeffamine D-2000 as in Example 2 but a temperature of 300° C. was required. Addition of sodium acetate and further heating resulted in decomposition of the polymer.

Comparative Examples 2 and 3 show the necessity of having $R^1$ and/or $R^2$ not be hydrogen in order for imidazolinone formation to occur.

EXAMPLE 3

The purpose of this example is to study the effectiveness of various catalysts in accomplishing cyclization to imidazolinone units. Equivalent amounts of p-phenylenebis(4,4-dimethyl-2-oxazolin-5-one) and Jeffamine D-2000 were mixed along with 5 mole % of the desired catalyst. The stirred mixture was heated at 240° C. under argon for 30 minutes, then an additional 1.5 hours under vacuum (1 torr) and collected. $^1$H-NMR analysis was used to estimate the amount of cyclization. Results are listed in TABLE I below.

TABLE I

| Catalyst | Relative effectiveness ($Na_2CO_3 = 1.0$) |
|---|---|
| none | 0 |
| tetraethylammonium fluoride | 0 |
| antimony trioxide | 0 |
| sulfuric acid | 0 |
| sodium phenoxide | 0.5 |
| sodium acetate | 1.0 |
| sodium carbonate | 1.0 |
| potassium cyclohexanebutyrate | 1.5 |
| sodium 2-ethylhexanoate | 2.0 |
| zinc cyanide | 2.0 |
| potassium t-butoxide | 2.3 |
| zinc chloride | 3.0 |
| sodium benzoate | 3.0 |
| zinc acetate | 3.3 |
| dibutyltin dilaurate | 3.2 |
| cesium acetate | 3.3 |
| sodium pivalate | 4.5 |
| ferric chloride | 5.2 |

EXAMPLE 4

N,N'-Azeleoylbis(α-aminoisobutyric acid) (17.92 g, 0.05 Mol) and N-methyliminobispropylamine (7.26 g, 0.05 Mol) were mixed and heated under argon by means of Wood's metal bath from 150° C. to 175° C. over 10 minutes, then held at that temperature for 2 hours 20 minutes. Vacuum was applied (0.5 torr) and the reaction mixture heated at 180°–190° C. for the next 3.5 hours. The mixture was then reacted further under vacuum at 205°–220° C. for 7 hours and at 245° C. for 5 hours. IR analysis of samples taken at various intervals indicated slow formation and cyclization of the polyamide. Spectral analysis of the final product verified the presence of both amide and imidazolinone structures. This example illustrates use of an acyclic precursor of a bisazlactone.

Comparative Example 4

N,N'-Adipolylbis(glycine) (15.61 g, 0.06 Mol) and N-methyliminobispropylamine (8.71 g, 0.06 Mol) were mixed and heated using a Wood's metal bath at 200° C. under argon for about 2 hours, then for an additional 2 hours under vacuum. During the course of the reaction, the mixture gradually turned dark and finally gelled to give a glassy, insoluble mass. IR analysis of the product showed the presence of amide but no imidazolinone abosorptions.

Similarly, attempts to prepare polyimidazolinones from N,N'-adipoylbis(glycine) and 1,6-hexanediamine, a 50:50 mixture of 1,6-hexanediamine and Jeffamine ED-900, or Jeffamine ED-900 alone, or from N,N'-sebacoylbis(alanine) and 1,6-hexanediamine produced crosslinked materials with no evidence for imidazolinone formation. This example again illustrates the necessity of having $R^1$ and/or $R^2$ not equal to hydrogen.

EXAMPLE 5

Preparation of a polyamide-poly(imidazolinone) copolymer containing approximately 50% of other units from condensation monomers A flask was charged with azeleoylbis(α-aminoisobutyric acid) (8.96 g, 0.025 Mol), azelaic acid (4.70 g, 0.025 Mol), and N,N'-bis(3-aminopropyl)piperazine (10.01 g, 0.05 Mol). The stirred mixture, under an argon atmosphere, was heated in a Wood's metal bath at 190°–200° C. for 7 hours, the last 4 hours under vacuum (1 torr). Spectral analysis of the glassy, reddish orange polymer indicated 70% cyclization to imidazolinone units. Fibers could be pulled from the melt.

Addition of sodium pivalate (0.5 g) and heating (220°–240° C.) in vacuum an additional 6 hours resulted in greater than 90% cyclization.

EXAMPLE 6

Another polyamide-poly(imidazoline) copolymer was prepared by a procedure similar to that of Example 5 from azeleoylbis(α-aminoisobutyric acid) (0.05 Mol), azelaic acid (0.10 Mol) and N,N'-bis(3-aminopropyl)-piperazine (0.15 Mol). The final copolymer contained 33% imidazolinone units.

Comparative Example 5

Polyamides were prepared by reacting 1,6-hexanediamine with equivalent amounts of the bisazlactones of Examples 2 and comparative Examples 2 and 3, respectively, in N-methylpyrrolidone as solvent at room temperature. The polyamides precipitated during the course of this polymerization reaction and were isolated in greater than 95% yield by filtration. IR and $^1$H-NMR (in $CF_3COOH$) spectra verified this polyamide structure. Differential thermal analysis (DTA) of all three polyamides indicated weight loss in the 150°–200° C. range, which could be interpreted as being due to imidazolinone formation by thermal dehydration. Heating samples of the polymers on a laboratory scale under vacuum, however, gave no evidence of imidazolinone formation but rather resulted in no change or in crosslinking or decomposition.

EXAMPLE 7

To the bisazlactone obtained from the Michael-type addition of Jeffamine CD-230 and 2-vinyl-4,4-dimethyl-2-oxazolin-5-one (12.57 g, 20.2 mMol) according to U.S. Ser. No. 424,500 was added 3,3'-iminobispropylamine (2.72 g, 20.8 mMol). A rapid exotherm ensued and within 5 minutes the reaction mixture had solidified. The reaction mixture, under an argon flow, was immersed in a Wood's metal bath, with stirring, at 100° C. The bath temperature was raised to 175° C. over 25 minutes and held at this temperature for 30 minutes. The temperature was then raised to 210° C., held there 30 minutes, then applied vacuum (1.5 torr) for 1 hour at 210° C. The reaction was stopped and the polymer, when cool, was a dark red, viscous oil. Spectral analyses indicated essentially complete cyclization to imidazolinone.

EXAMPLE 8

Bis(2-mercaptoethyl)ether (6.9 g, 0.05 Mol) was charged to an oven-dried flask, then 2 drops ethanesulfonic acid was added. To the stirring mixture was added 2-vinyl-4,4-dimethyl-2-oxazolin-5-one (13.9 g, 0.1 Mol). The resulting exotherm was controlled by application of an ice water bath for about 4 minutes, then the mixture was stirred at room temperature for an additional 2 hours. The flask containing the resultant bisazlactone was then returned to the ice bath and triethylenetetramine (7.31 g, 0.05 Mol) was added by syringe. A rapid viscosity increase occurred followed by solidification. Addition of toluene (20 mL) and tetrahydrofuran (20 mL) failed to dissolved the polymer. Therefore, the flask was placed in a Wood's metal bath at 150° C., the solvents were distilled out over 15 minutes, then the bath temperature was risied to 195° C. Heating was continued at this temperature for 3.5 hours, the last 15 minutes being under vacuum (1 torr), then the polymer was collected. Upon cooling, the polymer was a somewhat flexible, though glassy solid; the polymer was water soluble. Spectral analyses verified the poly(imidazolinone) structure.

EXAMPLES 9–10

Using reaction conditions similar to those of Example 7, the following polymers were preapred: Example 9—from equivalent amounts of the bisazlactone of Example 7 and ethylenediamine; spectral analyses verified the structure of the intermediate polyamide, inherent viscosity (0.5 g/100 mL $CHCl_3$)=0.114. Spectral analyses on the cyclized product indicated a majority of imidazolinone units, although some amide linkages remained, inherent viscosity ($CHCl_3$)=0.114; the polymer was a water soluble, sticky viscous material.

Example 10—from an 80:20 (mole/mole) mixture of the bisazlactone of Example 7 and p-phenylenebis(4-methyl-2-oxazolin-5-one) and an equivalent amount of ethylene diamine; the product was a flexible, yet brittle, water soluble solid. Spectral analyses indicated the poly(imidazolinone) structure.

EXAMPLE 11

Tetramethylenebis(4,4-dimethyl-2-oxazolin-5-one) (14.02 g, 0.05 Mol) and N-methyliminobispropylamine (7.26 g, 0.05 Mol) were reacted by a procedure similar to that of Example 2 except that the reaction temperature was 200°–210° C. for about 2 hours, the last hour under vacuum (1.5 torr). The brittle, light yellow polymer was water soluble. Spectral analyses verified the poly(imidazolinone) structure.

EXAMPLE 12

A slurry was prepared from tetramethylenebis(4,4-dimethyl-2-oxazolin-5-one) (14.02 g, 0.05 Mol) and 4,9-dioxa-1,12-dodecane diamine (10.22 g, 0.05 Mol). The flask containing this mixture was placed in a Wood's metal bath heated to 120° C. The bath temperature was slowly raised to 200° C. over 2.5 hours, then heating was continued at 200°–210° C., 0.1 torr, for 40 minutes. Spectral analysis of a sample of the polymer verified formation of the polyamide. Sodium acetate (1 g.) was added, and heating was continued under vacuum for an additional hour. IR analysis of a sample of the polymer indicated some cyclization had occurred. Heating under vacuum for another two hours caused additional but not complete cyclization. Another portion of sodium acetate (1 g.) was added and heating under vacuum continued for another 3 hours at which time spectral analyses showed nearly complete conversion to the cyclized structure. This light yellow, brittle, glassy polymer was soluble in water.

EXAMPLE 13

A poly(imidazolinone) was prepared by a procedure similar to that of Example 12 from tetramethylenebis(4,4-dimethyl-2-oxazolin-5-one) and 1,6-hexanediamine. This polymer formed a cloudy dispersion in water.

EXAMPLE 14

A poly(imidazolinone) was prepared by a procedure similar to that of Example 13 except that 50 mole % of the hexanediamine was replaced by an equivalent amount of Jeffamine D-2000 (amine equivalent weight 1023) and only 6% by weight (based on bisazlactone) of sodium acetate was used as catalyst. In this case, cyclization was much slower, requiring a total of 6.5 hours at 215° C. plus 7 hours at 225°–230° C. to achieve complete ring-closure. The final polymer was a viscous liquid, not soluble in water.

EXAMPLE 15

Tetramethylenebis(4,4-dimethyl-2-oxazolin-5-one) (11.28 g, 0.04 Mol) and 2-(2-hydroxyethoxy)ethyl amine (4.20 g, 0.04 Mol) were mixed in a flask under argon and placed in a Wood's metal bath at 85° C. The reaction temperature was raised to 150° C. over 25 minutes, held there for 1.75 hours, then allowed to cool. Spectral analysis of a sample of the product verified the anticipated polyesteramide structure. Sodium pivalate (0.248 g, 0.002 Mol) was added and the flask was replaced in the metal bath at 185° C. The temperature was raised to 235° C. over 1 hour, held at 235°–240° C. for 45 minutes under vacuum (1 torr) then allowed to cool. Cyclization of the amide units to imidazolinone units was verified by spectral analyses. The brittle, glassy poly(esterimidazolinone) was water soluble.

EXAMPLE 16

Tetramethylenebis(4,4-pentamethylene-2-oxazolin-5-one) (0.5 g, 1.38 mMol) and diethylenetriamine (0.143 g, 1.38 mMol) were reacted for 1 hr at 120° C., then 6 hr, at 160° C. under vacuum (1 torr) to produce a hard, brittle polymer, inherent viscosity (DMF, 30° C.)=0.1 Spectral analysis ($^{13}$C-NMR: 160.5, 185.1 ppm) verified the poly(imidazolinone) structure.

EXAMPLE 17

A poly(imidazolinone) was prepared from equivalent amounts of tetramethylenebis(4,4-dimethyl-2-oxazolin-5-one) and p-phenylenediamine by a procedure similar to that of Example 3, using 10 mole % of sodium pivalate as a catalyst. The final polymer was a clear, brittle solid, soluble in chloroform. Spectral analysis indicated essentially complete cyclization to the poly(imidazolinone) structure.

EXAMPLE 18

A poly(amide-imidazolinone) was prepared from N,N'-sebacoylbis(α-aminoisobutyric acid) (7.44 g, 0.02 Mol), N-(2-aminoethyl)piperazine (1.81 g, 0.014 Mol), and Kemamine DP-3680 TM (a C$_{36}$-aliphatic dimer diprimary amine available from Humko-Sheffield, Memphis, Tenn., amine equivalent weight 290, 2.48 g, 0.006 Mol). The stirred mixture was heated under argon at 200°–220° C. for 4.5 hours, the last 30 minutes being under vacuum (1 torr). The product was a light yellow, glassy solid. Spectral analyses verified the anticipated structure.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymer comprising one or more 2-imidazolin-5-one units of the formula

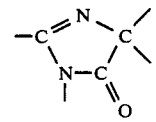

in the polymer backbone.

2. A polymer consisting of 2-imidazolin-5-one units having formula I

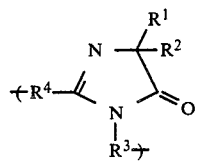

wherein
R$^1$ and R$^2$ independently represent an alkyl group of 1 to 12 carbon atoms, a cycloalkyl group having 3 to 12 carbon atoms, an aryl group having 6 to 12 carbon atoms, or R$^1$ and R$^2$ taken together with the carbon atom to which they are attached form a 5- to 12 membered carbocyclic ring;
R$^3$ is a divalent organic group having a number average molecular weight of up to 20,000 selected from the group consisting of (1) a hydrocarbyl group having 2 to 20 carbon atoms, and (2) polyoxyalkylene, (3) polyamide, (4) polyester, (5) polyolefin, (6) polyacrylate, and (7) polysiloxane groups; and
R$^4$ is a divalent organic group selected from the group consisting of

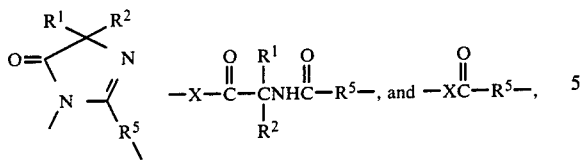

wherein
R¹ and R² are as previously defined, X is

—O—, or —S—, and R is hydrogen or an alkyl group of 1 to 12 carbon atoms or an aryl group of 6 to 12 carbon atoms, and $R^5$ is a divalent organic group having a number average molecular weight up to 20,000 selected from the group consisting of (1) a hydrocarbyl group having 2 to 20 carbon atoms, and (2) polyoxyalkylene, (3) polyester, (4) polyolefin, (5) polyacrylate, and (6) polysiloxane groups.

3. The polymer according to claim 2 in which $R^1$ and $R^2$ are each methyl or together form a pentamethylene group.

4. The polymer according to claim 2 wherein $R^3$ is selected from the group consisting of alkylene, alkylene imine, and arylene.

5. The polymer according to claim 2 wherein $R^3$ is an alkylene or an arylene group.

6. The polymer according to claim 5 wherein said alkylene or arylene group is interrupted by one to five catenary heteroatoms selected from the group of atoms consisting of oxygen, nitrogen, silicon, and sulfur.

7. The polymer according to claim 2 wherein any of the seven $R^3$ groups is substituted by at least one non-nucleophilic group selected from cyano, halo, ester, ether, keto, nitro, silyl, or sulfide, the carbon-containing groups having up to 10 carbon atoms.

8. The polymer according to claim 2 wherein $R^5$ is an alkylene or an arylene group.

9. The polymer according to claim 8 wherein said alkylene or arylene group is interrupted by one to five catenary heteroatoms selected from the group of atoms consisting of oxygen, nitrogen, silicon, and sulfur.

10. The polymer according to claim 2 wherein any of the six $R^5$ groups are substituted by at least one non-nucleophilic group selected from the class consisting of cyano, halo, ester, ether, keto, nitro, silyl, or sulfide, the carbon-containing groups having up to 10 carbon atoms.

11. A method for preparing a 2-imidazolin-5-one unit containing polymer comprising the steps of
(a) reacting
(1) at least one azlactone-functional compound of formula III

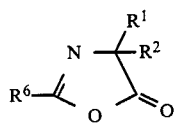 III wherein
R¹ and R² independently represent an alkyl group of 1 to 12 carbon atoms, a cycloalkyl group having 3 to 12 carbon atoms, an aryl group having 6 to 12 carbon atoms, or R¹ and R² taken together with the carbon atoms to which they are attached form a 5- to 12-membered carbocyclic ring, $R^6$ is

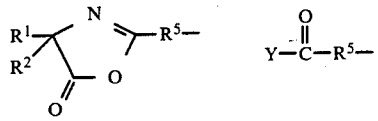

where
Y is HO—, $R^7$O—, or $CH_3COO$—,
$R^7$ is lower alkyl of 1–4 carbon atoms, phenyl or phenyl substituted by at least one non-nucleophilic group, and
$R^5$ is a divalent organic group having a number average molecular weight up to 20,000, selected from the group consisting of (1) a hydrocarbyl group having 2 to 20 carbon atoms, and (2) polyoxyalkylene, (3) polyester, (4) polyolefin, (5) polyacrylate, and (6) polysiloxane groups;

(2) with at least one nucleophilic group-substituted amine to provide a polyamide said amine having formula II $H_2N$—$R^3$—XH 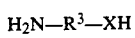 II wherein
X is

—O—, or —S—, and
R is hydrogen or an alkyl group of 1 to 12 carbon atoms or an aryl group of 6 to 12 carbon atoms, and
$R^3$ having a number average molecular weight of up to 20,000 and is selected from the class consisting of (1) a hydrocarbyl group having 2 to 20 carbon atoms, and (2) polyoxyalkylene, (3) polyamide, (4) polyester, (5) polyolefin, (6) polyacrylate, and (7) polysiloxane groups; and
(b) thermally treating said resulting polyamide in the presence of a dehydration catalyst to provide said 2-imidazolin-5-one unit-containing polymer.

12. The method according to claim 11 wherein said dehydration catalyst is an acid or base catalyst.

13. The method according to claim 12 wherein said base catalyst is selected from the group consisting of metal salts of carboxylic acids, amines, and alkoxides.

14. The method according to claim 11, wherein $R^5$ is an alkylene or an arylene group.

15. The method according to claim 14 wherein said alkylene or arylene group is interrupted by one to five catenary heteroatoms selected from the group of atoms consisting of oxygen, nitrogen, silicon, and sulfur.

16. The method according to claim 11 wherein any of the six $R^5$ groups are substituted by at least one non-nucleophilic group selected from the class consisting of cyano, halo, ester, ether, keto, nitro, silyl, or sulfide, the carbon-containing groups having up to 10 carbon atoms.

17. The method according to claim 11 wherein $R^3$ is an alkylene or an arylene group.

18. The method according to claim 17 wherein said alkylene or arylene group is interrupted by one to five catenary heteroatoms selected from the group of atoms consisting of oxygen, nitrogen, silicon, and sulfur.

19. The method according to claim 11, wherein any of the seven $R^3$ groups is substituted by at least one non-nucleophilic group selected from the class consisting of cyano, halo, ester, ether, keto, nitro, silyl, or sulfide, the carbon-containing groups having up to 10 carbon atoms.

* * * * *